(12) United States Patent
Marastoni

(10) Patent No.: US 10,227,224 B2
(45) Date of Patent: Mar. 12, 2019

(54) CONTINUOUS CYCLE BOTTLING LINE THERMAL CONDITIONING STRUCTURE IN CONTROLLED ENVIRONMENT

(71) Applicant: SACMI COOPERATIVA MECCANICI IMOLA SOCIETA' COOPERATIVA, Imola (IT)

(72) Inventor: Daniele Marastoni, San Giovanni In Persiceto (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 543 days.

(21) Appl. No.: 14/649,123

(22) PCT Filed: May 31, 2013

(86) PCT No.: PCT/IB2013/054508
§ 371 (c)(1),
(2) Date: Jun. 2, 2015

(87) PCT Pub. No.: WO2014/087257
PCT Pub. Date: Jun. 12, 2014

(65) Prior Publication Data
US 2015/0314517 A1 Nov. 5, 2015

(30) Foreign Application Priority Data
Dec. 3, 2012 (WO) .................. PCT/IP2012/056922

(51) Int. Cl.
*B65B 3/02* (2006.01)
*B67C 3/22* (2006.01)
(Continued)

(52) U.S. Cl.
CPC ............ *B67C 7/0073* (2013.01); *B29C 49/06* (2013.01); *B29C 49/4205* (2013.01);
(Continued)

(58) Field of Classification Search
CPC ..... B67C 7/002; B67C 7/0026; B67C 7/0073; B67C 2003/227; B67C 2003/228; B67C 2007/006; B67C 2007/0066; B65B 3/022
(Continued)

(56) References Cited

U.S. PATENT DOCUMENTS 3,220,596 A 11/1965 Martin
3,246,790 A 4/1966 Martin
(Continued)

FOREIGN PATENT DOCUMENTS

DE 32 32 039 A1 3/1983
DE 100 50 660 A1 4/2002
(Continued)

*Primary Examiner* — Stephen F. Gerrity
(74) *Attorney, Agent, or Firm* — Pearne & Gordon LLP

(57) ABSTRACT

A continuous cycle bottling line for containers of thermoplastic material comprises: a parison molding unit; a blow-molding unit for making containers; a unit for filling the containers; a thermal conditioning structure for the parisons, for heating and cooling the parisons in a heating module and in a cooling module, respectively; an automatic controlled-atmosphere storage system for containing the parisons and interconnected with the other parts of the line; a pressurization system configured to pressurize at least the following parts of the line: the storage system, the at least one blow-molding unit and the connections between the thermal conditioning structure and the storage system; where the heating and cooling modules, alternatively or in combination, i) are pressurized, ii) have a plurality of shutters configured to occlude the opening at the end of each parison, so that the interior of the parison remains closed when the parison is inside the heating and cooling module.

13 Claims, 3 Drawing Sheets

(51) Int. Cl.
  *B67C 7/00* (2006.01)
  *B29C 49/02* (2006.01)
  *B29C 49/06* (2006.01)
  *B29C 49/36* (2006.01)
  *B29C 49/42* (2006.01)
  *B29C 49/46* (2006.01)
  *B29C 49/64* (2006.01)
  *B29C 49/68* (2006.01)
  *B29L 31/00* (2006.01)
  *B29L 31/56* (2006.01)
  *B29K 105/00* (2006.01)

(52) U.S. Cl.
  CPC ......... *B29C 49/4273* (2013.01); *B29C 49/46* (2013.01); *B29C 49/6418* (2013.01); *B65B 3/022* (2013.01); *B67C 7/002* (2013.01); *B29C 49/36* (2013.01); *B29C 49/6427* (2013.01); *B29C 49/68* (2013.01); *B29C 2049/028* (2013.01); *B29C 2049/4697* (2013.01); *B29K 2105/258* (2013.01); *B29L 2031/565* (2013.01); *B29L 2031/7158* (2013.01); *B67C 2003/227* (2013.01); *B67C 2003/228* (2013.01)

(58) Field of Classification Search
  USPC ..................... 53/558, 561, 574, 282, 167
  See application file for complete search history.

(56) References Cited

U.S. PATENT DOCUMENTS

| | | | |
|---|---|---|---|
| 4,104,807 A | 8/1978 | Braun | |
| 4,468,165 A | 8/1984 | Kawasaki | |
| 4,597,242 A | 7/1986 | Hendriks et al. | |
| 5,059,079 A | 10/1991 | Foulke et al. | |
| 5,409,545 A | 4/1995 | Levey et al. | |
| 5,702,734 A | 12/1997 | Hartman et al. | |
| 5,953,234 A | 9/1999 | Singer et al. | |
| 5,996,322 A | 12/1999 | La Barre | |
| 6,119,433 A | 9/2000 | Kitahora et al. | |
| 6,185,910 B1 | 2/2001 | Achhammer | |
| 6,189,292 B1 | 2/2001 | Odell et al. | |
| 6,230,472 B1 | 5/2001 | Stahlecker | |
| 6,341,469 B1 | 1/2002 | Derouault et al. | |
| 6,428,304 B1 | 8/2002 | Sartor et al. | |
| 6,688,839 B1 | 2/2004 | Hirschek et al. | |
| 7,097,045 B2 | 8/2006 | Winkler | |
| 7,900,422 B2 | 3/2011 | Fischer | |
| 8,506,869 B2 | 8/2013 | Lappe et al. | |
| 8,556,620 B2 | 10/2013 | Parrinello et al. | |
| 8,677,723 B2 | 3/2014 | Bottger et al. | |
| 9,296,148 B2 | 3/2016 | Feuilloley | |
| 9,321,621 B2 | 4/2016 | Kitano et al. | |
| 9,415,429 B2 | 8/2016 | Benedetti | |
| 9,446,550 B2 | 9/2016 | Parrinello et al. | |
| 2003/0083769 A1 | 5/2003 | Yamazaki | |
| 2003/0147738 A1 | 8/2003 | Hanel | |
| 2004/0187444 A1 | 9/2004 | Hutchinson et al. | |
| 2004/0193311 A1 | 9/2004 | Winkler | |
| 2005/0097863 A1 | 5/2005 | Taggart | |
| 2005/0154184 A1 | 7/2005 | Shi | |
| 2005/0217211 A1 | 10/2005 | Py | |
| 2005/0223677 A1 | 10/2005 | Py | |
| 2006/0111812 A1 | 5/2006 | Okamoto et al. | |
| 2007/0220835 A1 | 9/2007 | Till | |
| 2008/0029481 A1 | 2/2008 | Kothari et al. | |
| 2008/0042325 A1 | 2/2008 | Imatani et al. | |
| 2008/0118335 A1 | 5/2008 | Ishida et al. | |
| 2008/0166442 A1 | 7/2008 | Balboni et al. | |
| 2008/0296820 A1 | 12/2008 | Bambi et al. | |
| 2009/0071104 A1 | 3/2009 | Fischer | |
| 2009/0077933 A1 | 3/2009 | Backhaus et al. | |
| 2009/0127076 A1 | 5/2009 | Balboni et al. | |
| 2009/0186571 A1 | 7/2009 | Haro | |
| 2009/0223175 A1 | 9/2009 | Monzel | |
| 2010/0127435 A1 | 5/2010 | Feuilloley | |
| 2010/0133729 A1 | 6/2010 | Shah | |
| 2010/0205903 A1 | 8/2010 | Py | |
| 2010/0256248 A1 | 10/2010 | Salmang et al. | |
| 2011/0056172 A1 | 3/2011 | Klenk et al. | |
| 2011/0094616 A1 | 4/2011 | Hayakawa et al. | |
| 2011/0109018 A1 | 5/2011 | Parrinello et al. | |
| 2011/0146202 A1 | 6/2011 | Imatani et al. | |
| 2011/0219728 A1 | 9/2011 | Humele | |
| 2011/0260372 A1 | 10/2011 | Hahn | |
| 2011/0291332 A1 | 12/2011 | Voth et al. | |
| 2012/0070522 A1 | 3/2012 | Voth et al. | |
| 2012/0085071 A1 | 4/2012 | Hahn et al. | |
| 2012/0100238 A1 | 4/2012 | Humele et al. | |
| 2012/0101627 A1 | 4/2012 | Len | |
| 2012/0160637 A1 | 6/2012 | Itoh et al. | |
| 2012/0222801 A1 | 9/2012 | Pedercini et al. | |
| 2012/0286459 A1 | 11/2012 | Neubauer et al. | |
| 2013/0061557 A1 | 3/2013 | Kitano et al. | |
| 2013/0328248 A1* | 12/2013 | Herold et al. | B29C 49/46 264/535 |
| 2014/0027956 A1 | 1/2014 | Parrinello et al. | |
| 2014/0157726 A1 | 6/2014 | Clusserath et al. | |
| 2014/0318083 A1* | 10/2014 | Marastoni | B29C 49/06 53/453 |
| 2014/0338291 A1 | 11/2014 | Parrinello et al. | |
| 2015/0274498 A1* | 10/2015 | Van Steen et al. | B67C 3/008 53/453 |
| 2015/0298906 A1 | 10/2015 | Marastoni | |

FOREIGN PATENT DOCUMENTS

| | | |
|---|---|---|
| DE | 10 2008 057 403 A1 | 5/2010 |
| EP | 1 462 393 A1 | 9/2004 |
| EP | 1 462 393 B1 | 8/2006 |
| EP | 2 388 129 A1 | 11/2011 |
| EP | 2 447 038 A2 | 5/2012 |
| EP | 2578504 A1 | 4/2013 |
| GB | 1 039 511 A | 8/1966 |
| IT | 01359024 A | 3/2007 |
| JP | S6048802 A | 3/1985 |
| JP | 2003081441 A | 3/2003 |
| JP | 2005280880 A | 10/2005 |
| JP | 2007106438 A | 4/2007 |
| JP | 2010524742 A | 7/2010 |
| WO | 99/55604 A1 | 11/1999 |
| WO | 2006/092651 A1 | 9/2006 |
| WO | 2008/090207 A1 | 7/2008 |
| WO | 2008132603 A1 | 11/2008 |
| WO | 2009/127962 A2 | 10/2009 |
| WO | 2011148953 A1 | 12/2011 |

* cited by examiner

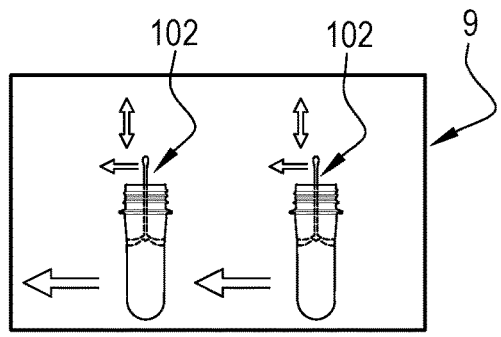
FIG. 1A
FIG. 1
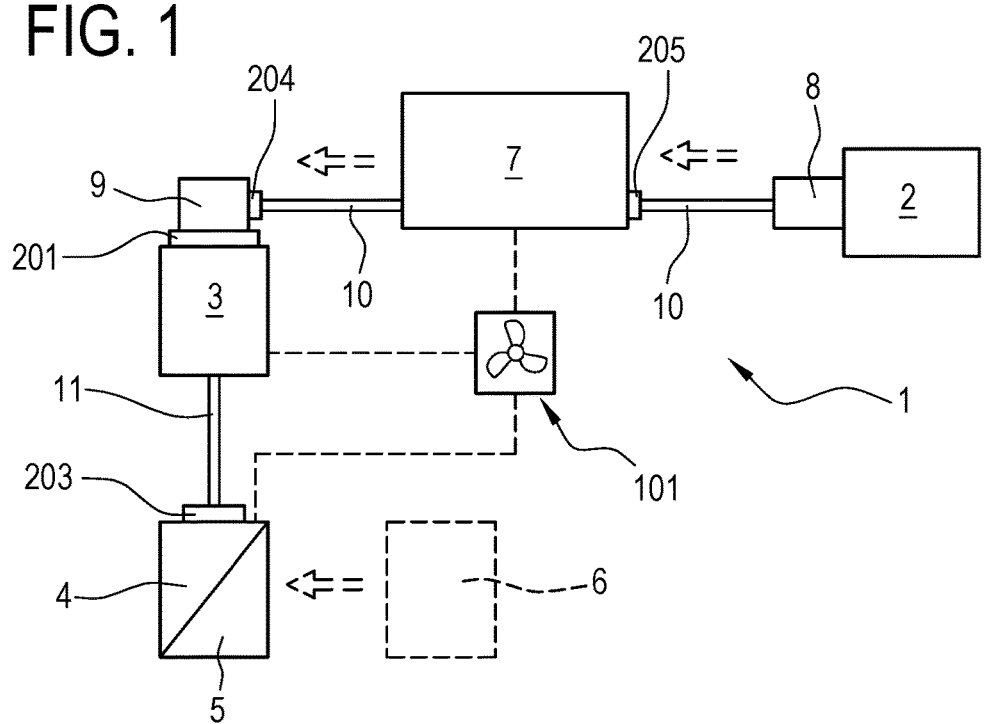
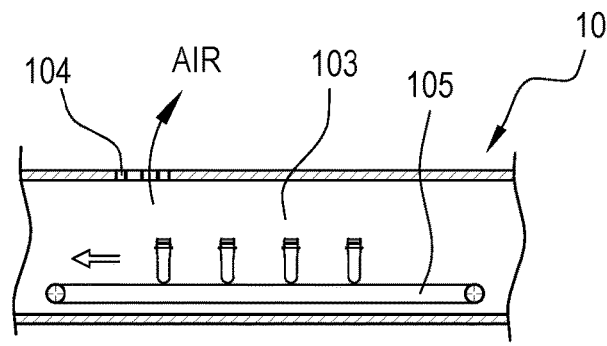
FIG. 1B

CONTINUOUS CYCLE BOTTLING LINE THERMAL CONDITIONING STRUCTURE IN CONTROLLED ENVIRONMENT

TECHNICAL FIELD

This invention relates to a bottling line, and more specifically, a continuous cycle line for bottling containers of thermoplastic material.

The invention also relates to a method for continuous cycle production and filling of containers of thermoplastic material in a bottling line.

BACKGROUND ART

In the field of bottling lines for filling containers of thermoplastic material, several solutions are known, for example, from the following patent documents: WO2009/127962 (in the name of the same Applicant as this invention) and US2011219728A1.

These bottling lines comprise: a moulding unit for making parisons from thermoplastic material in its raw form; a blow-moulding unit for making the containers by blow-moulding the parisons; a unit for filling the containers; a structure for thermally conditioning the parisons.

More specifically, the line described in WO2009/127962 comprises an oven for heating the parisons and a module for cooling the parisons. It also comprises a storage system configured to contain the parisons and connected to the thermal conditioning structure to receive and feed parisons from and to the thermal conditioning structure.

The line described in WO2009/127962, however, has the disadvantage of not achieving a high level of hygiene for the parisons and, more in general, for all the plastic objects processed in the line: namely, parisons, containers and caps.

In effect, the line is not provided with any systems for maintaining a high level of hygiene for the products processed in the line itself.

The line described in US2011219728A1, on the other hand, comprises a sterilizing unit for the parisons fed into the blow-moulding unit. Furthermore, the filler, capper and cap maker are installed in a cleanroom.

This line, therefore, is in effect provided with a system for maintaining a certain level of hygiene for the products processed but has the disadvantage of being rather inconvenient to manage and not very reliable since the room to be kept clean is very large and subject to contamination.

Further, the sterilizing unit of the line is difficult to manage and inefficient because, although the filler is in step with the parison production unit, the working requirements and work loads of these units may differ considerably over time (for example in the space of a week or a month).

DISCLOSURE OF THE INVENTION

This invention has for an aim to provide a bottling line (and a method for continuous cycle production and filling of containers of thermoplastic material) which overcome the above mentioned disadvantages of the prior art.

More specifically, the aim of this invention is to provide a bottling line which allows a high level of hygiene to be obtained in a particularly simple manner for the objects processed in the line.

A further aim of this invention is to provide a bottling line which allows management flexibility and efficiency and which, in particular, optimizes the production capabilities of the different units making up the line.

These aims are fully achieved by the line and method according to the invention as characterized in the appended claims.

More specifically, the bottling line according to the invention is a continuous cycle line for containers of thermoplastic material, comprising:
- at least one moulding unit for making parisons of thermoplastic material from the thermoplastic material in its raw form;
- at least one blow-moulding unit configured to receive the parisons and to blow-mould them in such a way as to make containers designed to be filled;
- at least one filling unit configured to receive the containers from the blow-moulding unit and to fill them with liquid or semi-liquid food products;
- a parison thermal conditioning structure configured to receive the parisons from the moulding unit and to heat and cool the parisons;
- an automatic storage system internally defining a controlled atmosphere, configured to contain the parisons and connected to the thermal conditioning structure to receive and feed parisons from and to the thermal conditioning structure.

The thermal conditioning structure comprises at least one cooling module, connected downstream of the parison moulding unit to receive parisons to be cooled and to the storage system to transfer the cooled parisons, and at least one heating module connected to the storage system to receive previously stored parisons to be heated and connected upstream of the blow-moulding unit in order to feed it with heated parisons.

The heating module and the cooling module may be integrated in a single unit or, alternatively, they may be distinct units which are separate and spaced from each other. If the cooling and heating modules are integrated, the thermal conditioning structure comprises, for example, a parison oven configured to reduce or turn off heating and to turn on cooling elements.

The line also preferably comprises a capping unit (preferably installed downstream of the filling unit) designed to receive caps and to apply the caps to the container feeding out of the filler in order to close the containers.

Optionally, the line might also comprise a unit for moulding the caps from raw plastic.

In light of this, it should be noted that the line is configured to process objects made of plastic material, in particular, three kinds of objects: namely, parisons, containers and caps.

According to one aspect of the invention, the storage system, at least some of the units making up the line and the connections between the storage system and the units making up the line are pressurized. The pressurized units are at least the filler (or the filler/capper) and the blow-moulder.

More specifically, the storage system, at least of the units of the line and the connections between (all) the units of the line define respective sealed environments (ducts in the case of the connections), which are separated by partition walls from the room in which the line is installed. These sealed environments are kept at a higher pressure (than the room in which the line is installed) by means of a system of fans or other outlet vents.

Further, the cooling modules of the thermal conditioning structure have the following features, alternatively or in combination:
i) they are pressurized (like the aforementioned other units of the line);

ii) they are configured to keep the parisons closed (by means of shutter elements operating on the openings defined by the parisons) while the parisons remain inside them.

This solution keeps the parisons (and more in general, the plastic objects processed by the line) clean inside the line.

In light of this, it should be noted that the line preferably comprises a sterilizing unit located at the infeed of the filling unit to sterilize the containers feeding out of the blow-moulding unit.

In this case, the filler operates in an aseptic environment.

Alternatively or in combination, the line preferably comprises a sterilizing unit located at the infeed of the blow-moulding unit (upstream or downstream of the heating module) to sterilize the parisons feeding out of the storage system (or feeding out of the parison moulding unit).

In this case, the blow-moulder (and the heating module) and the filler (and, more in general, the part of the line downstream of the blow-moulder or of the heating module) operate in an aseptic environment.

Alternatively or in combination, the line preferably comprises a sterilizing unit located at the infeed of the storage system, or inside the storage system, to sterilize the parisons (and, more in general, all the objects stored in the storage system) which are to be stored in the storage system.

In this case, the storage system and the part of the line downstream of the storage system operate in an aseptic environment.

The line preferably also comprises a sterilizing unit located at the infeed of the capping unit to sterilize the caps before they enter the capping unit (that is to say, the caps feeding out of the storage system or, if present, out of the cap moulding unit).

In light of this, the fact that the line defines a path (for the plastic objects processed by the line) which is confined within a sealed environment, separated by the walls of the room in which the line is installed, and pressurized, makes it possible (with evident economic advantage) to simplify the sterilizing unit (or units). In effect, the objects to be sterilized have from the start (that is, before they are sterilized) a particularly high level of hygiene.

Another aspect of this invention regards the layout of the line.

In a first variant embodiment, the parison moulding unit (or units) is of the injection moulding type.

In this case, the cooling module (which receives the parisons from the parison moulding unit) is preferably connected only to the storage system. That is to say, the heating module is configured to receive the parisons only from the storage system (the storage system does not have a bypass allowing the parisons to be transferred directly from the cooling module to the heating module).

Also, in this case, the heating and cooling modules are distinct modules (and are located upstream and downstream of the storage system, respectively).

The line preferably also comprises a plurality of parison moulding units connected in parallel to the storage system (upstream of the storage system) and equipped with corresponding cooling modules.

Preferably, the line further, or alternatively, comprises a plurality of blow-moulding units connected in parallel to the storage system (downstream of the storage system) and equipped with corresponding heating modules.

In the latter case (plurality of blow-moulding units) the parison moulding unit might, in another variant embodiment, be of the compression moulding type (comprising a rotary compression machine).

In this case, (parison moulding unit of the rotary compression type) the thermal conditioning structure located downstream of the moulding unit is connected not only to the storage system but also directly to the cooling module of at least one of the blow-moulding units to allow feeding the blow-moulding unit directly by the parison moulding unit (the two units being both of the rotary type and in step with each other) without necessarily passing by the storage system.

In this same variant embodiment, on the other hand, at least one other blow-moulding unit of the plurality is fed by the storage system. That means that during the periods in which the filler is shut down, the parison moulding unit continues to operate and feeds parisons to the storage system instead of to the corresponding blow-moulding unit. The parisons thus accumulated in the storage system are used to feed one or more of the additional blow-moulding units other than the one that is connected in step with the parison moulding unit, thus increasing the hourly output capacity of the line. Thus, for example, two blow-moulders can be connected to the same filling unit having an hourly output capacity substantially equal to the sum of the hourly output capacities of the two blow-moulders.

These line layout solutions allow high production efficiency and energy saving.

Another aspect of this invention regards the management of the line.

The line comprises a management unit equipped with a memory containing a database and a processor programmed with a line management software.

The line management software is configured to coordinate the operation of the storage system with the operation of the other units making up the line.

For this purpose, the database contains management parameter reference values. A non-limiting list of these parameters is given below by way of an example:
- at least one parameter representing the type of parisons (and/or the type of containers and/or the type of caps);
- a plurality of parameters representing the operating speeds of the different parts of the line, such as the units (for example, the rotation speed of a carousel of the blow-moulding unit) and the conveyors in the connections between the units and the storage system;
- a plurality of control parameters representing the pressure (or other physical quantities) in various parts of the line (for example, in the storage system, in the units and in the connections).

It should be noted that the parameter representing the type of parisons might, for example, also be associated with operating parameters of the thermal conditioning units, such as temperatures and times, for example.

The management unit receives values for one or more of these parameters, for example by means of settings received from a user through an interface or by means of sensors designed to measure one or more of the parameters.

As a function of the values received and of programmed instructions (defining predetermined combinations of parameter values), the management unit automatically sets the values of one or more of the parameters and transmits them to local control units of the various units and of the storage system (or parts of the storage system). Preferably, the line management unit is programmed to control (directly) the operation of a transport element movable within the storage system to pick up objects entering the storage system and place them in storage compartments of the storage system (inside drawers) and to retrieve the objects stored and make them available at the outfeed of the storage system.

With regard to the line according to the invention, in particular, the storage system of the line, the following should also be noted.

The connections of the units with each other, and between the units and the storage system, are located in a controlled-atmosphere environment. More specifically, the connections located in a controlled-atmosphere environment are those between the parison moulding unit, the thermal conditioning unit, the blow-moulding unit, the filling unit, (the cap moulding unit, if any), the capping unit and the storage system. Thus, the bottling line defines an integrated system comprising the above mentioned units and related connections. Preferably, the integrated system internally defines (comprises) a plurality of corresponding pressurized, interconnected spaces (chambers). This allows the parisons to be moved within the line (that is, the integrated system) while remaining in a controlled-atmosphere environment.

Preferably, the line comprises a plurality of outlet vents which operate on corresponding spaces forming part of the plurality of spaces to keep them at respective reference pressures. In the controlled atmosphere, there is (preferably) overpressure. Preferably, in the controlled atmosphere, the environment is aseptic. In that case, sanitizing means are provided in that environment. Thus, the bottling line defines an integrated system where the connections between the parison moulding unit, the thermal conditioning unit, the blow-moulding unit, the filling unit, the cap moulding unit, the capping unit and the storage system, are located in a controlled-atmosphere environment.

More specifically, the units making up the line (for example, the parison moulding unit, the thermal conditioning unit, the blow-moulding unit, the filling unit, the cap moulding unit, the capping unit and the storage system internally define respective spaces. The connections between the units internally define respective spaces. These spaces all have a controlled atmosphere (for example, each space is pressurized) and are in communication with each other (that is to say, they are interconnected) so that the objects handled by the line (parisons, caps and bottles) remain in a controlled-atmosphere environment at all times when they are inside the line.

Preferably, therefore, the line (that is, the integrated system) comprises a plurality of interconnected spaces (inside the units making up the line and the connections between them) inside which the objects handled by the line remain in a controlled-atmosphere environment at all times. Thus, on all the paths along which they move in the line, the objects handled by the line remain in a controlled-atmosphere environment. Preferably, the spaces are pressurized independently of each other (for example, at different pressures).

Thus, the storage system is preferably pressurized (with air under pressure). The storage system is preferably pressurized with ionized air.

The storage system may extend horizontally or, preferably, vertically. In the latter case (storage system extending vertically), the infeed and outfeed (of the caps and parisons) into and out of the storage system are preferably located at different heights.

Preferably, the storage system is a drawer type storage system, that is, it comprises a plurality of drawers. The storage system has a structure defining a plurality of housings (or slots) for the drawers. These housing are arranged in a plurality of juxtaposed columns.

The storage system also comprises (at least) one lift having a platform (or carriage) designed to receive and move the drawers. The lift platform is movable vertically (varying its height from the storage system floor) and horizontally, in a longitudinal direction at right angles to the vertical direction. More specifically, the (at least one) lift is configured in such a way that the platform is movable adjacently to all the housings in the storage system in order to withdraw or insert drawers from and into the housings. Preferably, the storage system comprises a drawer washing station. The storage system preferably also comprises a drawer drying station. The storage system also comprises at least one loading bay and at least one unloading bay for the objects stored therein. The loading and unloading bays are accessible from the lift. The loading and unloading bays are located in zones of the storage system adjacent the conveyors designed to transport the objects into and out of the storage system (respectively) and constituting the connections between the storage system and the other units of the line. The loading and unloading bays are equipped with respective manipulators (automatic handling means) for picking up and moving the objects stored in the storage system. More specifically, the manipulator of the loading bay is configured to pick up objects from at least one of the conveyors and to place them in at least one drawer (empty and waiting to be filled) positioned in the loading bay. The manipulator of the unloading bay is configured to pick up objects from at least one drawer (full and waiting to be emptied) positioned in the loading bay and to place them on at least one of the conveyors. The lift moves within the storage system (driven by the control unit) between the loading bay, the housings in the storage system and the unloading bay, in such a way as to carry empty drawers to the loading bay, pick up full drawers from the loading bay, carry full drawers to the unloading bay and pick up empty drawers from the unloading bay and to insert full drawers into the housings and withdraw empty drawers from the housings of the storage system.

Preferably, the storage system comprises sterilizing means located in the unloading bay and operating on the objects in transit through the unloading bay (leaving the storage system) in order to sanitize them. In addition (or alternatively), the storage system preferably comprises sterilizing means located in the loading bay and operating on the objects in transit through the loading bay (entering the storage system) in order to sanitize them. Preferably, the interior of the storage system is an aseptic (that is, sterile) environment. In light of this, the storage system comprises sterilizing means for sterilizing the space inside the storage system.

These sterilizing means comprise, for example, UV ray sources or nozzles configured to spray a sterilizing fluid, antistatic bars and/or ionizing devices.

In the loading bay and/or in the unloading bay, the storage system preferably comprises a system for checking and rejecting the objects. This checking and rejection system comprises, for example, an optical detector connected to a processor. In the loading bay and/or in the unloading bay, the storage system preferably comprises a system for counting the objects (inserted into or withdrawn from the drawers). This counting system comprises, for example, a video camera connected to a processor. In the loading bay and/or in the unloading bay, the storage system preferably comprises a system for weighing the objects. This weighing system comprises, for example, a loading cell or other known weighing means.

Preferably, the storage system comprises a system of outlet vents (for example connected to fans) located in a high-pressure zone of the storage system. Preferably, the storage system also comprises a system of inlet vents (for example connected to fans) located in a low-pressure zone of the storage system. The pressure in the low-pressure zone is lower than that in the high-pressure zone but preferably higher than the pressure outside the storage system (outside the bottling line). Preferably, the high- and low-pressure zones of the storage system are located at opposite ends of the storage system, so as to generate a (laminar) flow of air through the entire space inside the storage system.

Preferably, the drawers are provided with holes to allow an air flow to pass through them. Preferably, the storage system structure defining the drawer housings is a structure (for example, a lattice frame) defining openings through which an air flow can pass.

Preferably, the storage system has the shape of a parallelepiped. Preferably the storage system has a rectangular base, with two long sides and two short sides. The storage system accordingly has a lateral wall with two large faces and two small faces. Preferably, the high- and low-pressure zones are located at opposite faces of the lateral wall of the storage system, preferably the small faces of the lateral wall.

Preferably, the storage system comprises a plurality of filters coupled to the outlet vents (downstream of the corresponding pressure fans) to filter the air delivered into the storage system.

It should be noted that the ducts which enclose the connections between one unit and another of the line are kept at a pressure which is higher than the pressure outside the line. Preferably, the line comprises outlet vents located in at least one limited stretch of the duct which encloses a connection (this applies to one connection and preferably to all the connections). That way, inside the ducts enclosing the connections there are zones at a high pressure and zones at a (relatively) low pressure (where, however, the pressure is higher than it is outside the line). Preferably, the ducts which enclose the connections are kept at an internal pressure which is lower than that of the storage system, especially in the stretches of the ducts connected to the storage system. Preferably, the ducts which enclose the connections are kept at an internal pressure which is lower than that of the units which they connect, especially in the stretches of the ducts connected to the units.

That way, the bottling line defines a sealed system of interconnected chambers and ducts defining an internal space which is pressurized relative to a room in which the line is installed. Within this sealed system of chambers and ducts there are zones where the pressure is relatively high and zones where the pressure is relatively low. The different pressure zones within the sealed system of chambers and ducts are determined by the position of the outlet vents (or other pressurizing means of known type) located in the line. The presence of different pressure zones within the sealed system of chambers and ducts determines air flows having predetermined directions within the line (that is, within the sealed system of chambers and ducts).

Preferably, the lift is movable within the storage system along rails which follow a predetermined path. Preferably, the lift is coupled to the rails by rolling elements. This reduces the formation of dust or other material in suspension inside the storage system. As regards the arrangement of the rails, that is to say, of the path followed by the lift in the storage system, attention is drawn to the following. Preferably, the lift carriage is movable vertically, preferably for the full height of the storage system (that is, its vertical stroke is equal to the height of the storage system).

Also, preferably, the lift carriage is movable horizontally, preferably along the direction of the long sides of the storage system base (that is, its horizontal stroke is equal in length to the long sides of the rectangular base of the storage system). In light of this, there are different embodiments.

In a first embodiment, the storage system includes an empty passage which cuts the small lateral faces and separates the storage system into two parts along a dividing plane parallel to the large lateral faces. The lift comprises a frame having two vertical uprights (whose length is equal to the height of the storage system) which define vertical guide rails for opposite ends of the carriage (which is a substantially rectangular platform). The frame is in turn movable horizontally along a (horizontal,) direction parallel to the large faces. The frame runs on horizontal rails or on a single horizontal rail extending along the dividing plane. In this case, the carriage and the drawers are positioned perpendicularly to the planes defined by the small lateral faces of the storage system.

In a second embodiment, the carriage and the drawers are positioned parallel to the planes defined by the small lateral faces of the storage system. The storage system includes at least one empty passage (vertical aisle) which cuts the large lateral faces and separates the storage system into two or more parts along a dividing plane parallel to the small lateral faces. For example, the storage system might have a plurality of empty passages (vertical aisles) which cut the large lateral faces and separate the storage system into a plurality of parts along dividing planes parallel to the small lateral faces. The storage system also comprises slideways for the lift carriage extending horizontally inside the storage system, to allow the lift carriage to move horizontally inside the storage system. For example, at one or more predetermined levels (that is, at one or more predetermined heights from the storage system floor) there might be slideways for the lift carriage extending horizontally for the full length of the storage system (measured along the long sides of the rectangular base of the storage system). Preferably, the horizontal slideways are located at the lowest level or at the highest level (or at an intermediate level, that is, half way up the storage system). Each of the vertical aisles (positioned transversely to the large lateral faces) has vertical slideways to allow the carriage to move vertically up and down these aisles. When the carriage is aligned with the horizontal slideways, it is able to move horizontally from one vertical aisle to another. It should be noted that the structure of the storage system might also by divided into a plurality of blocks (or modules) movable relative to each other to open and close the free passages between one block and another. These passages define vertical and/or horizontal aisles to move the lift (that is, the lift carriage) within the storage system. In this situation, therefore, the at least one vertical and/or horizontal aisle is generated dynamically by moving the blocks. Moreover, they may be formed (opened and closed) anywhere in the storage system. Thanks to this structure, the difference between the total volume of the space inside the storage system and the volume of the space occupied by the drawers inside the storage system is limited to the volume of a single horizontal aisle and a single vertical aisle. This maximizes the space inside the storage system, reducing its overall dimensions (relative to the number of drawers, that is, product storage space). In light of this, the storage system drawers are organized in vertical stacks. The stacks are slidably coupled to a storage system base so that they can be moved horizontally. Drive means (for example, electric motors or other actuators) for the blocks are connected to a control unit (for example, an electronic card) designed to control and manage the storage system. The control unit is set up to receive as input a signal representing the position of the lift carriage and the position (of the housing, that is, the drawer) inside the storage system which the carriage must reach. The control unit is programmed to process and output a signal for driving the drawer block movement means, to form a path (one vertical and one horizontal aisle or a succession of horizontal and vertical stretches of aisle) which places the carriage in communication with the position to be reached. The drawers can also be moved vertically relative to each other (individually or in blocks) in order to dynamically generate horizontal aisles (or parts of aisles) along which to move the lift carriage.

BRIEF DESCRIPTION OF THE DRAWINGS

Below is a description of embodiments of the invention, illustrated solely by way of non-limiting example in the accompanying drawings, in which:

FIG. 1 schematically illustrates a line according to the invention in a plan view;

FIG. 1A illustrates a heating module of the thermal conditioning structure of the line of FIG. 1;

FIG. 1B illustrates a communication between the thermal conditioning structure and the storage system, in the line of FIG. 1;

DETAILED DESCRIPTION OF PREFERRED EMBODIMENTS OF THE INVENTION

Figure 2:
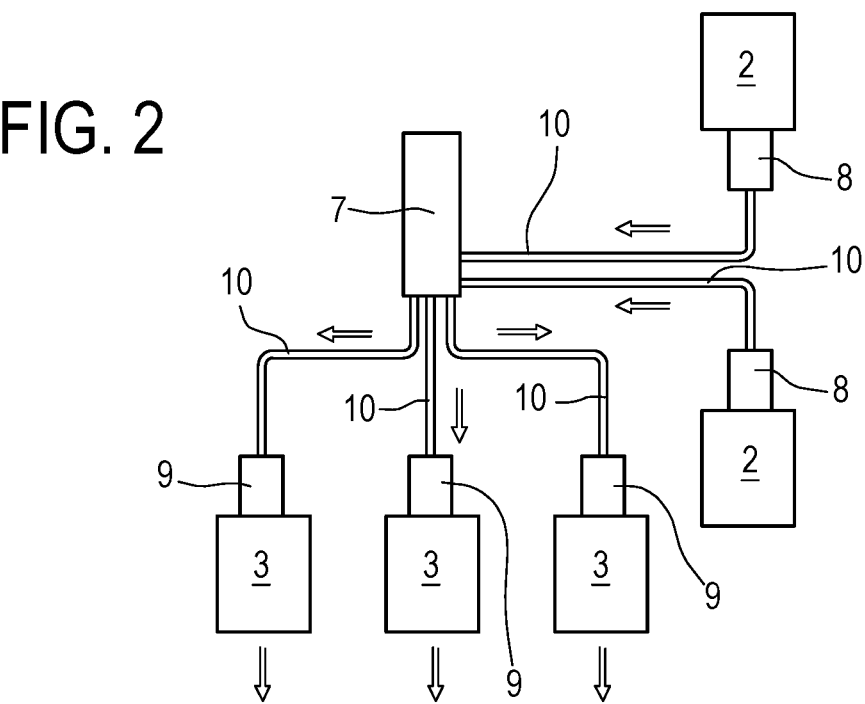
FIG. 2 shows the line of FIG. 1 in a variant embodiment of the layout of the line.

The numeral 1 in the accompanying drawings denotes a bottling line according to this invention.

The bottling line of the invention is a continuous cycle line for bottling containers of thermoplastic material (for example bottles) preferably designed to be filled with liquids (preferably beverages or other liquid food products).

The numeral 2 denotes a moulding unit (or a plurality thereof) for making parisons of thermoplastic material from the thermoplastic material in its raw form.

The moulding unit 2 may, in principle, be of any type, an injection moulding unit or a (rotary) compression moulding unit.

The numeral 3 denotes a blow-moulding unit (or a plurality thereof), this blow-moulding unit 3 being configured to receive the parisons and to blow-mould them in such a way as to make containers designed to be filled. The blow-moulding unit 3 is preferably a rotary machine.

The numeral 4 denotes a filling unit (or a plurality thereof). The filling unit 4 is configured to receive the containers from the blow-moulding unit and to fill them with liquid or semi-liquid food products.

The numeral 5 denotes a capping unit (or a plurality thereof). The capping unit 5 is configured to receive caps made of thermoplastic material and to apply the caps securely to respective full containers.

Preferably, the capping unit 5 is integrated in the filling unit 4.

The numeral 6 denotes a cap moulding unit for making caps from raw plastic material.

The cap moulding unit 6 is connected to the capping unit 5 to feed the caps thereto.

The numeral 7 denotes a storage system designed to contain at least the parisons. The storage system 7 is preferably configured to also contain the caps and the containers which have been blow-moulded from the parisons.

The storage system 7 is an automatic storage system. It is managed by an electronic management unit (not illustrated).

Also, inside it the storage system 7 defines a controlled atmosphere.

The numeral 8 denotes a cooling module (or a plurality thereof).

The cooling module 8 is connected downstream of the parison moulding unit 2 to receive parisons to be cooled and is connected to the storage system 7 to transfer the cooled parisons.

The numeral 9 denotes a heating module (or a plurality thereof).

The heating module 9 is connected to the storage system 7 to receive previously stored parisons in order to heat them. Also, the heating module 9 is connected upstream of the blow-moulding 3 in order to feed it with heated parisons.

The cooling module 8 and the heating module 9 constitute a structure (or unit) for thermally conditioning the parisons. The thermal conditioning structure is configured to receive the parisons from the moulding unit 2 and to heat and cool the parisons, to feed the blow-moulding unit 3.

The storage system 7 is thus connected to the thermal conditioning structure to receive and feed parisons.

The numeral 10 denotes the connections between the thermal conditioning structure and the storage system.

The numeral 11 denotes a connection between the blow-moulding unit 3 and the filling unit 4.

More in general, it should be noted that the line 1 comprises a plurality of connections designed to move the plastic objects processed by the line (parisons, caps and containers) from one unit to another and to and from the thermal conditioning structure and the storage system 7.

These connections comprise conveyors enclosed within protective covers. The conveyors thus define substantially closed spaces in which the objects processed by the line 1 travel.

More specifically, preferably, the connections (at least those between the thermal conditioning structure and the storage system) comprise:
closed ducts 103 provided with slots 104 to allow controlled flow of air from a pressurized environment inside the ducts to an environment outside the line;
conveyors 105 (preferably, but not necessarily, belt conveyors) designed transport the objects located inside the ducts.

The line 1 is installed in a room. Preferably, the room does not define a controlled atmosphere but is under ordinary atmospheric conditions (for example, atmospheric pressure).

According to the present disclosure, the line 1 comprises a pressurization system (101) configured to generate an overpressure at least inside the following parts of the line, compared to the atmosphere outside the line: the storage system 7, the blow-moulding unit 3 and the connections 10 between the thermal conditioning structure and the storage system and, preferably, the connection 11 between the blow-moulding unit 3 and the filling unit 5.

Also, according to the invention, the cooling modules 8 and the heating modules 9, alternatively or in combination:

i) are internally pressurized;

ii) have a plurality of shutters (102) configured to occlude the opening at the end of each parison, so that the interior of the parison remains closed when the parison is inside the heating and cooling module.

Preferably, the shutters are defined by spindles connected to a conveyor and operatively insertable (at least partly) into the parisons in order to pick them up and transport them.

The pressurization system comprises, for example, a plurality of outlet vents (not illustrated) located at various points in the line (in the storage system 7, in the connections, in the units and, if necessary, also in the thermal conditioning structure).

With regard to line layout, several variant embodiments are possible.

A first variant embodiment of the layout is illustrated in FIG. 1.

A second variant embodiment of the layout is illustrated in FIG. 2.

Figure 3:
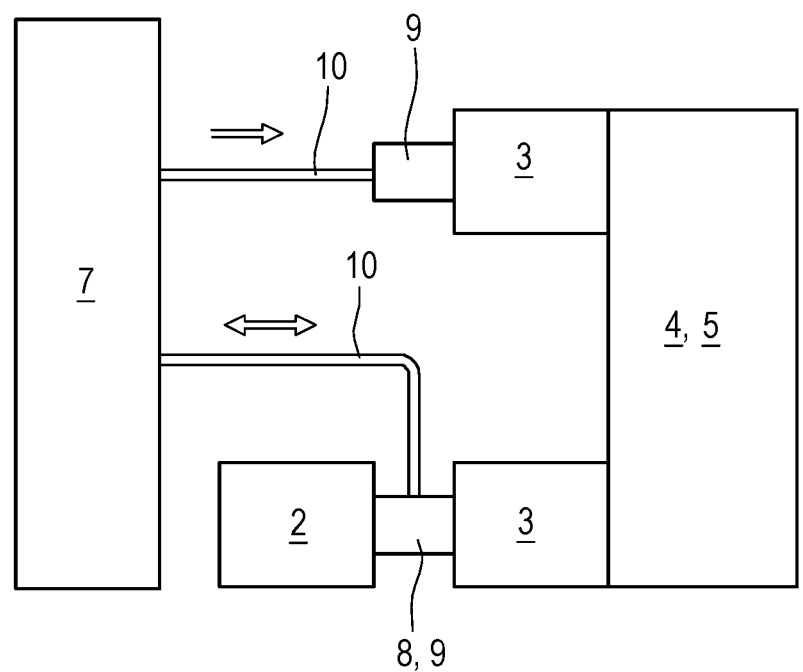
FIG. 3 shows the line of FIG. 1 in a further variant embodiment of the layout of the line.

A third variant embodiment of the layout is illustrated in FIG. 3.

Figure 4:
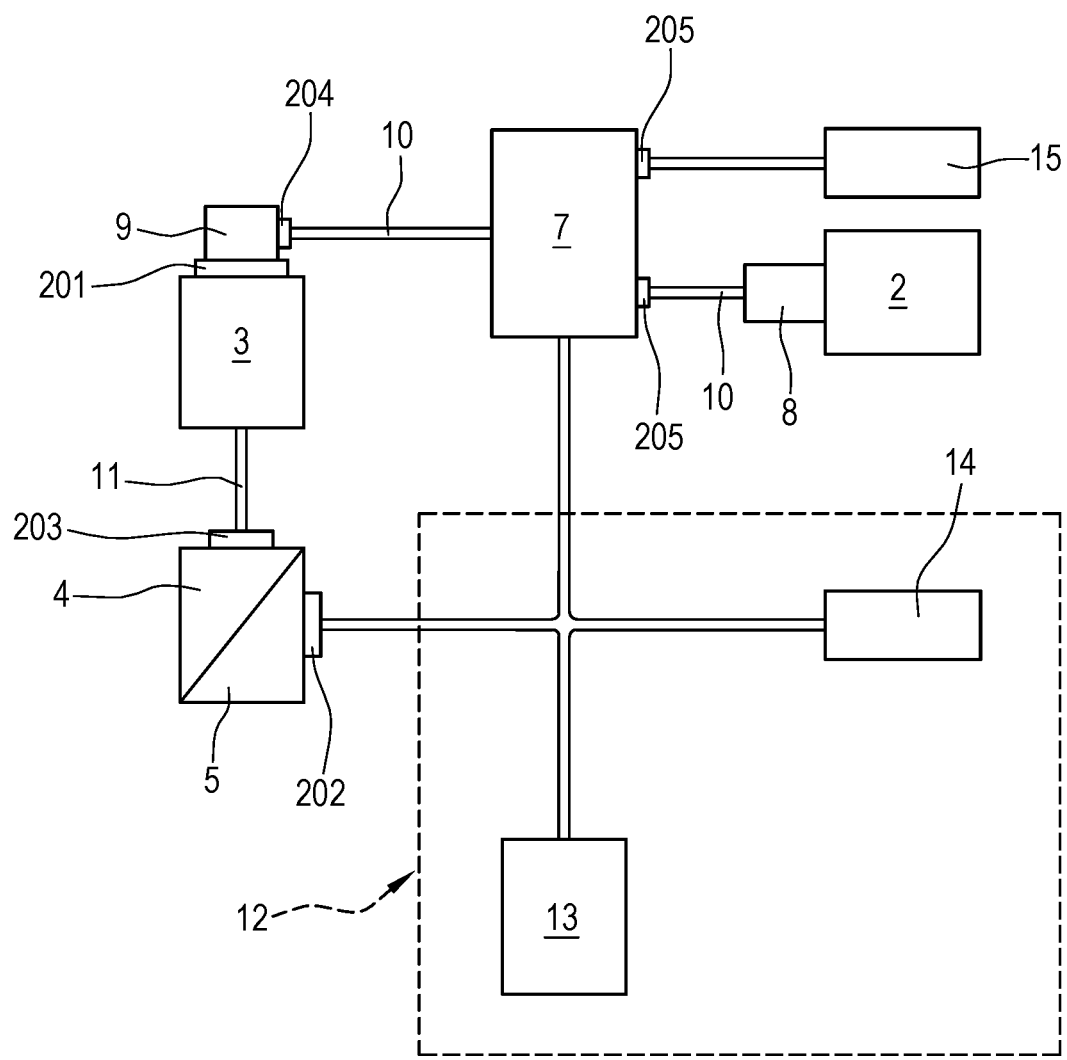
FIG. 4 shows the line of FIG. 1 in a further variant embodiment of the layout of the line.

A fourth variant embodiment of the layout is illustrated in FIG. 4.

In the first and second variant embodiments of the layout, the parison moulding unit 2 is an injection moulding unit. Further, the cooling module 8 is distinct and separate from the heating module 9. More specifically, the cooling module 8 is located in the proximity of the parison moulding unit 2 and the heating module 9 is located in the proximity of the blow-moulding unit 3.

Also, preferably, the connections between the cooling modules 8 and the storage system 7 and between the heating modules 9 and the storage system 7 are one-way connections, which means that the parisons always move from the cooling module 8 towards the storage system 7 and always from the storage system 7 towards the heating module 9.

The second embodiment differs from the first in that it comprises a plurality of parison moulding units 2, a corresponding plurality of cooling modules 8, connected to the storage system 7 in parallel with each other and a plurality of blow-moulding units 3 and a corresponding plurality of heating modules 9 connected to the storage system 7 in parallel with each other. The plurality of blow-moulding units 3 are connected to one or more filling units 4 in various possible ways. For example, they may be connected to a corresponding plurality of filling units 4 or to a single filling unit 4 common to all of them. In the third variant embodiment of the layout, the moulding unit 2 for making parisons from thermoplastic material is a rotary compression moulding machine. The line 1 also comprises at least a first and a second blow-moulding unit 3 connected to the same filling unit 4 in parallel with each other. Further, the thermal conditioning structure comprises a heating module 9 and a cooling module 8 which are integrated with each other and interposed between the moulding unit 2 and the first blow-moulding unit 3. The integrated heating and cooling modules 9 and 8 are connected to the storage system 7 by a two-way connection. A further heating module 9 is located upstream of the second blow-moulding unit 3 and is connected to the storage system 7.

The fourth variant embodiment of the layout is a layout according to the first embodiment with the following additional features.

The line 1 (optionally) comprises an area 12. Located in the area 12 are a cap moulding unit 13 and a cap container 14 (of the type known as "octabin", a container of standard size or capacity and open, that is to say, without any systems controlling the space inside it).

The cap moulding unit 13 and the cap container 14 are connected to the storage system 7 and/or directly to the capping unit 5. The cap moulding unit 13 and the cap container 14 may feed the caps to the storage system 7 or, if the filler/capper is in the stand-by configuration (not running), the caps may be fed directly to the capping unit 5.

The line 1 further comprises a parison container 15 (a container of the type known as "octabin") connected to the storage system 7 in order to feed it with parisons and also (in parallel), or alternatively, to the parison moulding unit 2.

It should be noted that the description which follows applies indistinctly to all the layout variant embodiments of the line 1.

Preferably, the line 1 comprises at least one sterilizing unit (of essentially known type) configured to sterilize the objects processed by the line 1 (in particular the parisons but also the caps and, if necessary, the blow-moulded containers). For example, the sterilizing unit comprises an electron beam or UV ray emitter directed at the walls of the object to be sterilized.

Preferably, the line 1 comprises at least a first sterilizing unit 201 for sterilizing the parisons and a second sterilizing unit 202 for sterilizing the caps. The cap sterilizing unit is located at the infeed of the capping unit 5.

Preferably, a third sterilizing unit 203 is located at the infeed of the filling unit 4 to sterilize the containers entering the filling unit 4. In light of this, it should be noted that the filling unit 4 preferably defines an aseptic environment inside it.

In an embodiment, the first sterilizing unit 201, is positioned at the infeed of the blow-moulding unit 3 to sterilize the parisons entering the blow-moulding unit 3. In light of this, it should be noted that the blow-moulding unit also preferably defines an aseptic environment inside it.

Preferably, in addition to one or more of the aforementioned sterilizing units (or alternatively to one or more such sterilizing units), there is a fourth sterilizing unit 204 located at the infeed of the heating module 9 of the thermal conditioning structure to sterilize the parisons entering the heating module 9. In light of this, it should be noted that the heating module 9 also defines an aseptic environment inside it.

Preferably, in addition to one or more of the aforementioned sterilizing units (or alternatively to one or more such sterilizing units), there is a fifth sterilizing unit 205 located at the infeed of the storage system 7 to sterilize the parisons (and the caps and, more generally, all the other objects) entering the storage system 7. In light of this, it should be noted that the storage system 7 also defines an aseptic environment inside it. This invention also provides a continuous cycle method for continuous cycle production and filling of containers of thermoplastic material in a bottling line.

The method comprises the following steps:
making parisons of thermoplastic material from the thermoplastic material in its raw form, in at least one moulding unit 2;
blow-moulding the parisons in moulds of at least one blow-moulding unit 3 to make containers designed to be filled;
filling the containers with liquid or semiliquid products (preferably food products) in a filling unit 4 fed by the blow-moulding unit;
storing the parisons in an automatic storage system 7 internally defining a controlled atmosphere;

cooling the parisons feeding out of the at least one moulding unit 2, in a cooling module 8 before the parisons are stored in the storage system 7;

heating the parisons withdrawn from the storage system 7, in a heating module 9, before the parisons are fed into the blow-moulding unit 3.

According to the invention, the method comprises the following steps:

generating an overpressure, compared to the atmosphere outside the line 1, at least in the storage system 7, in the at least one blow-moulding unit 3 and in the connections of the line 1.

With regard to the thermal conditioning structure, the method preferably further comprises the following steps, alternatively to, or in combination with, each other:

i) generating an overpressure in the at least one heating module 9 and in the at least one cooling module 8 of the thermal conditioning structure;

ii) occluding the cavity at the end of each parison while the parisons are inside the heating module 9 and the cooling module 8 so that the interior of each parison remains closed for as long as it is inside the module The method preferably also comprises a step of acquiring, through the agency of an electronic management unit, the values of a plurality of parameters representing the operation of the line 1 and the size of the objects processed by the line (the values being acquired, for example, from sensors or user settings applied through an interface).

Further, the management unit preferably transmits control signals to an electronic control unit of the storage system 7, to automatically control operations by which objects transported to the storage system 7 through the connections of the line 1 are stored in the selfsame storage system and operations by which objects are retrieved from the storage system 7 and fed out of the storage system 7 through the connections of the line 1.

Also, preferably, the management unit calculates with a respective internal processor the values of one or more control parameters as a function of the parameters acquired and transmits the control parameters to one or more (preferably all) of the parts of the line 1 (units, thermal conditioning structure and connections).

The paragraphs listed below, labelled with alphanumeric references, are non-limiting example modes of describing this invention.

A. A continuous cycle bottling line for containers of thermoplastic material, comprising:

at least one moulding unit for making parisons of thermoplastic material from the thermoplastic material in its raw form;

at least one blow-moulding unit configured to receive the parisons and to blow-mould them in such a way as to make containers designed to be filled;

at least one filling unit configured to receive the containers from the blow-moulding unit and to fill them with liquid or semi-liquid food products;

a parison thermal conditioning structure configured to receive the parisons from the moulding unit and to heat and cool the parisons;

an automatic storage system internally defining a controlled atmosphere, configured to contain the parisons and connected to the thermal conditioning structure to receive and feed parisons from and to the thermal conditioning structure, wherein the thermal conditioning structure comprises at least one cooling module, connected downstream of the parison moulding unit to receive parisons to be cooled and to the storage system to transfer the cooled parisons, and at least one heating module connected to the storage system to receive previously stored parisons to be heated and connected upstream of the blow-moulding unit in order to feed it with heated parisons.

A1. The line of paragraph A, comprising a pressurization system configured to generate an overpressure at least inside the following parts of the line, compared to the atmosphere outside the line: the storage system, the at least one blow-moulding unit and the connections between the thermal conditioning structure and the storage system, and wherein the at least one heating module and the at least one cooling module of the thermal conditioning structure, alternatively or in combination:

i) are internally pressurized;

ii) have a plurality of shutters configured to occlude the opening at the end of each parison, so that the interior of the parison remains closed when the parison is inside the heating and cooling module.

A1.1. The line of paragraph A1, wherein at least in the heating module the shutter elements are movable gripper elements for transporting the parisons along a path inside the module.

A1.2. The line of paragraph A1 or of paragraph A1.1, wherein the pressurization system is configured to generate, inside the storage system and the at least one blow-moulding unit, an overpressure that is greater than the overpressure generated inside the connections between the thermal conditioning structure and the storage system.

A1.3. The line of any of the paragraphs from A1 to A1.2, wherein the connections between the thermal conditioning structure and the storage system comprise:

closed ducts 103 provided with slots to allow controlled flow of air from an environment inside the ducts 103, where there is overpressure, to an environment outside the line;

conveyors for transporting the parisons and located inside the ducts.

A2. The line of any of the paragraphs from A to A1.3, wherein the at least one cooling module is distinct and separate from the at least one heating module, the at least one cooling module being located in the proximity of the parison moulding unit and the at least one heating module being located in the proximity of the blow-moulding unit.

A2.1. The line of paragraph A2, wherein the at least one cooling module and the at least one heating module of the thermal conditioning structure are connected to the storage system by means of respective straight conveyors.

A3. The line of any of the paragraphs from A to A2.1, wherein the connections between the at least one cooling module and the storage system and between the at least one heating module and the storage system are one-way connections, which means that the parisons always move from the cooling module of the thermal conditioning structure towards the storage system and always from the storage system towards the heating module of the thermal conditioning structure.

A4. The line of any of the paragraphs from A to A3, comprising a plurality of moulding units for making parisons of thermoplastic material, each connected to a respective cooling module, the cooling modules of the thermal conditioning structure being connected to the storage system so that the moulding units are connected to the same storage system in parallel with each other.

A4.1. The line of paragraph A4, comprising a plurality of blow-moulding units, each connected to a respective heating module, the heating modules of the thermal conditioning structure being connected to the storage system so that the blow-moulding units are connected to the same storage system in parallel with each other.

A4.1.1. The line of paragraph A4.1, comprising a plurality of filling units, one for each blow-moulding unit, connected to corresponding blow-moulding units.

A5. The line of any of the paragraphs from A to A4.1.1, wherein the moulding unit for making parisons of thermoplastic material is an injection moulding unit for making parisons from the thermoplastic material in its raw form.

A6. The line of any of the paragraphs from A to A2.1 wherein the moulding unit for making parisons of thermoplastic material is a rotary compression moulding machine; and wherein the line comprises at least a first and a second blow-moulding unit connected to the same filling unit 4 in parallel with each other; and wherein the thermal conditioning structure comprises:
- a heating module and a cooling module which are integrated with each other, interposed between the parison moulding unit and the first blow-moulding unit and connected to the storage system by means of a two-way connection;
- a further heating module located upstream of the second blow-moulding unit and connected to the storage system.

A7. The line of any of the paragraphs from A to A6, comprising a capping unit configured to receive caps made of thermoplastic material and to apply the caps securely to respective full containers, the capping unit being integrated with the filling unit and positioned downstream thereof.

A8. The line of any of the paragraphs from A to A7, comprising a sterilizing unit located at the infeed of the filling unit to sterilize the containers entering the filling unit, wherein the filling unit defines an aseptic environment inside it.

A9. The line of any of the paragraphs from A to A8, comprising a sterilizing unit located at the infeed of the blow-moulding unit to sterilize the parisons entering the blow-moulding unit, wherein the blow-moulding unit and the filling unit define an aseptic environment inside them.

A10. The line of any of the paragraphs from A to A9, comprising a sterilizing unit located at the infeed of the heating module of the thermal conditioning structure to sterilize the parisons entering the heating module, wherein the heating module, the blow-moulding unit and the filling unit define an aseptic environment inside them.

A11. The line of any of the paragraphs from A to A10, comprising a sterilizing unit located at the infeed of the storage system to sterilize the parisons entering the storage system, wherein the storage system, the heating module, the blow-moulding unit and the filling unit define an aseptic environment inside them.

A12. The line of any of the paragraphs from A8 to A11, comprising:
- a capping unit configured to receive caps made of thermoplastic material and to apply the caps securely to respective full containers;
- a sterilizing unit located at the infeed of the capping unit to sterilize the containers entering the capping unit, wherein the capping unit defines an aseptic environment inside it.

A13. The line of any of the paragraphs from A to A12, comprising a management unit configured to acquire (for example, from sensors or user settings applied through an interface) the values of a plurality of parameters representing the operation of the line and the size of the objects processed by the line.

A13.1. The line of paragraph A13, wherein the management unit is programmed to transmit control signals to an electronic control unit of the storage system, to automatically control operations by which objects transported to the storage system through the connections of the line are stored in the selfsame storage system and operations by which objects are retrieved from the storage system and fed out of the storage system through the connections of the line 1.

A13.2. The line of paragraph A13 or A13.1, wherein the management unit is configured to calculate with a respective internal processor the values of one or more control parameters as a function of the parameters acquired and is programmed to transmit the control parameters to one or more (preferably all) of the parts of the line (for example, the units, the thermal conditioning structure and the connections).

B. A method for continuous cycle production and filling of containers of thermoplastic material in a bottling line, comprising the following steps:
- making parisons of thermoplastic material from the thermoplastic material in its raw form, in at least one moulding unit;
- blow-moulding the parisons in moulds of at least one blow-moulding unit to make containers designed to be filled;
- filling the containers with liquid or semiliquid food products in a filling unit fed by the blow-moulding unit;
- storing the parisons in an automatic storage system internally defining a controlled atmosphere;
- cooling the parisons feeding out of the at least one moulding unit, in a cooling module before the parisons are stored in the storage system;
- heating the parisons withdrawn from the storage system, in a heating module, before the parisons are fed into the blow-moulding unit.

B1. The method of paragraph B, comprising the following steps:
- generating an overpressure, compared to the atmosphere outside the line, at least in the storage system, in the at least one blow-moulding unit and in the connections between the thermal conditioning structure and storage system;

alternatively or in combination,
i) generating an overpressure in the at least one heating module and in the at least one cooling module of the thermal conditioning structure;
ii) occluding the opening at the end of each parison while the parisons are inside the heating module and the cooling module so that the interior of each parison remains closed for as long as it is inside the module.

B2. The method of paragraph B or B1, comprising the following steps:
- acquiring, through the agency of an electronic management unit, the values of a plurality of parameters representing the operation of the line and the size of the objects processed by the line;
- transmitting control signals to an electronic control unit of the storage system, through the agency of the management unit, to automatically control operations by which objects transported to the storage system through the connections of the line are stored in the selfsame storage system and operations by which objects are retrieved from the storage system and fed out of the storage system through the connections of the line.

The invention claimed is:
1. A continuous cycle bottling line for containers of thermoplastic material, comprising:

at least one moulding unit for making parisons of thermoplastic material from the thermoplastic material in raw form;

at least one blow-moulding unit configured to receive and to blow-mould the parisons in such a way as to make containers designed to be filled;

at least one filling unit configured to receive the containers from the blow-moulding unit and to fill the containers with liquid or semi-liquid food products;

a parison thermal conditioning structure configured to receive the parisons from the moulding unit and to heat and cool the parisons;

an automatic storage system internally defining a controlled atmosphere, configured to contain the parisons and connected to the thermal conditioning structure to receive and feed parisons from and to the thermal conditioning structure, wherein the thermal conditioning structure comprises at least one cooling module, connected downstream of the parison moulding unit to receive parisons to be cooled and to the storage system to transfer the cooled parisons, and at least one heating module connected to the storage system to receive previously stored parisons to be heated and connected upstream of the blow-moulding unit in order to feed the blow-moulding unit with heated parisons, the bottling line comprising a pressurization system configured to generate an overpressure at least inside the following parts of the line, compared to the atmosphere outside the line: the storage system, the at least one blow-moulding unit and connections between the thermal conditioning structure and the storage system, and each one of the at least one heating module and the at least one cooling module of the thermal conditioning structure, alternatively or in combination:

i) is internally pressurized;

ii) has a plurality of shutters configured to occlude an opening at the end of each parison, so that an interior of the parison remains closed when the parison is inside the heating and cooling module, and wherein the connections between the thermal conditioning structure and the storage system comprise:

closed ducts provided with slots to allow controlled flow of air from an environment inside the ducts, where there is overpressure, to an environment outside the line;

conveyors for transporting the parisons and located inside the ducts.

2. The bottling line according to claim 1, wherein the pressurization system is configured to generate, inside the storage system and the at least one blow-moulding unit, an overpressure that is greater than the overpressure generated inside the connections between the thermal conditioning structure and the storage system.

3. The bottling line according to claim 1, wherein the at least one cooling module is distinct and separate from the at least one heating module, the at least one cooling module being located in the proximity of the parison moulding unit and the at least one heating module being located in the proximity of the blow-moulding unit.

4. The bottling line according to claim 3, wherein the at least one cooling module and the at least one heating module of the thermal conditioning structure are connected to the storage system by means of respective straight conveyors.

5. The bottling line according to claim 1, comprising a plurality of moulding machines for making parisons of thermoplastic material, each connected to a respective cooling module, the cooling modules of the thermal conditioning structure being connected to the storage system so that the moulding units are connected to the same storage system in parallel with each other.

6. The bottling line according to claim 1, comprising a plurality of blow-moulding units, each connected to a respective heating module, the heating modules of the thermal conditioning structure being connected to the storage system so that the blow-moulding units are connected to the same storage system in parallel with each other.

7. The bottling line according to claim 6, comprising a plurality of filling units, one for each blow-moulding unit, connected to corresponding blow-moulding units.

8. The bottling line according to claim 1, wherein the at least one moulding unit for making parisons of thermoplastic material is an injection moulding unit for making parisons from the thermoplastic material in raw form.

9. The bottling line according to claim 1, comprising a capping unit configured to receive caps made of thermoplastic material and to apply the caps securely to respective full containers, the capping unit being integrated with the at least one filling unit and positioned downstream thereof.

10. A continuous cycle bottling line for containers of thermoplastic material, comprising:

at least one moulding unit for making parisons of thermoplastic material from the thermoplastic material in raw form;

at least one blow-moulding unit configured to receive and to blow-mould the parisons in such a way as to make containers designed to be filled;

at least one filling unit configured to receive the containers from the blow-moulding unit and to fill the containers with liquid or semi-liquid food products;

a parison thermal conditioning structure configured to receive the parisons from the moulding unit and to heat and cool the parisons;

an automatic storage system internally defining a controlled atmosphere, configured to contain the parisons and connected to the thermal conditioning structure to receive and feed parisons from and to the thermal conditioning structure, wherein the thermal conditioning structure comprises at least one cooling module, connected downstream of the parison moulding unit to receive parisons to be cooled and to the storage system to transfer the cooled parisons, and at least one heating module connected to the storage system to receive previously stored parisons to be heated and connected upstream of the blow-moulding unit in order to feed the blow-moulding unit with heated parisons;

a pressurization system configured to generate an overpressure at least inside the following parts of the line, compared to the atmosphere outside the line: the storage system, the at least one blow-moulding unit and connections between the thermal conditioning structure and the storage system, wherein the at least one heating module of the thermal conditioning structure has a plurality of shutters configured to occlude an opening at the end of each parison, so that an interior of the parison remains closed when the parison is inside the heating and cooling module, wherein in the heating module the shutters are movable gripper elements for transporting the parisons along a path inside the heating module.

11. A continuous cycle bottling line for containers of thermoplastic material, comprising:

at least one moulding unit for making parisons of thermoplastic material from the thermoplastic material in raw form;

at least one blow-moulding unit configured to receive and to blow-mould the parisons in such a way as to make containers designed to be filled;

at least one filling unit configured to receive the containers from the blow-moulding unit and to fill the containers with liquid or semi-liquid food products;

a parison thermal conditioning structure configured to receive the parisons from the moulding unit and to heat and cool the parisons;

an automatic storage system internally defining a controlled atmosphere, configured to contain the parisons and connected to the thermal conditioning structure to receive and feed parisons from and to the thermal conditioning structure, wherein the thermal conditioning structure comprises at least one cooling module, connected downstream of the parison moulding unit to receive parisons to be cooled and to the storage system to transfer the cooled parisons, and at least one heating module connected to the storage system to receive previously stored parisons to be heated and connected upstream of the blow-moulding unit in order to feed the blow-moulding unit with heated parisons, the bottling line comprising a pressurization system configured to generate an overpressure at least inside the following parts of the line, compared to the atmosphere outside the line: the storage system, the at least one blow-moulding unit and connections between the thermal conditioning structure and the storage system, and wherein each one of the at least one heating module and the at least one cooling module of the thermal conditioning structure, alternatively or in combination:

i) is internally pressurized;

ii) has a plurality of shutters configured to occlude an opening at the end of each parison, so that an interior of the parison remains closed when the parison is inside the heating and cooling module, wherein the connections between the at least one cooling module and the storage system and between the at least one heating module and the storage system are one-way connections, whereby the parisons always move from the cooling module of the thermal conditioning structure towards the storage system and always from the storage system towards the heating module of the thermal conditioning structure.

12. A continuous cycle bottling line for containers of thermoplastic material, comprising:

at least one moulding unit for making parisons of thermoplastic material from the thermoplastic material in raw form;

at least one blow-moulding unit configured to receive and to blow-mould the parisons in such a way as to make containers designed to be filled;

at least one filling unit configured to receive the containers from the blow-moulding unit and to fill the containers with liquid or semi-liquid food products;

a parison thermal conditioning structure configured to receive the parisons from the moulding unit and to heat and cool the parisons;

an automatic storage system internally defining a controlled atmosphere, configured to contain the parisons and connected to the thermal conditioning structure to receive and feed parisons from and to the thermal conditioning structure, wherein the thermal conditioning structure comprises at least one cooling module, connected downstream of the parison moulding unit to receive parisons to be cooled and to the storage system to transfer the cooled parisons, and at least one heating module connected to the storage system to receive previously stored parisons to be heated and connected upstream of the blow-moulding unit in order to feed the blow-moulding unit with heated parisons, the bottling line comprising a pressurization system configured to generate an overpressure at least inside the following parts of the line, compared to the atmosphere outside the line: the storage system, the at least one blow-moulding unit and connections between the thermal conditioning structure and the storage system, and wherein each one of the at least one heating module and the at least one cooling module of the thermal conditioning structure, alternatively or in combination:

i) is internally pressurized;

ii) has a plurality of shutters configured to occlude an opening at the end of each parison, so that an interior of the parison remains closed when the parison is inside the heating and cooling module, and wherein the at least one moulding unit for making parisons of thermoplastic material is a rotary compression moulding machine; and wherein the line comprises at least a first and a second blow-moulding unit connected to the same filling unit in parallel with each other; and wherein the thermal conditioning structure comprises:

a heating module and a cooling module which are integrated with each other, interposed between the parison moulding unit and the first blow-moulding unit and connected to the storage system by means of a two-way connection;

a further heating module located upstream of the second blow-moulding unit and connected to the storage system.

13. A continuous cycle bottling line for containers of thermoplastic material, comprising:

at least one moulding unit for making parisons of thermoplastic material from the thermoplastic material in raw form;

at least one blow-moulding unit configured to receive and to blow-mould the parisons in such a way as to make containers designed to be filled;

at least one filling unit configured to receive the containers from the blow-moulding unit and to fill the containers with liquid or semi-liquid food products;

a parison thermal conditioning structure configured to receive the parisons from the moulding unit and to heat and cool the parisons;

an automatic storage system internally defining a controlled atmosphere, configured to contain the parisons and connected to the thermal conditioning structure to receive and feed parisons from and to the thermal conditioning structure, wherein the thermal conditioning structure comprises at least one cooling module, connected downstream of the parison moulding unit to receive parisons to be cooled and to the storage system to transfer the cooled parisons, and at least one heating module connected to the storage system to receive previously stored parisons to be heated and connected upstream of the blow-moulding unit in order to feed the blow-moulding unit with heated parisons, the bottling line comprising a pressurization system configured to generate an overpressure at least inside the following parts of the line, compared to the atmosphere outside the line: the storage system, the at least one blow-moulding unit and connections between the thermal conditioning structure and the storage system, and wherein each one of the at least one heating module and the at least one cooling module of the thermal conditioning structure, alternatively or in combination:

i) is internally pressurized;

ii) has a plurality of shutters configured to occlude an opening at the end of each parison, so that an interior of the parison remains closed when the parison is inside the heating and cooling module, and wherein the bottling line further comprises a sterilizing unit, which is located at one of the following locations:

- at an infeed of the at least one filling unit to sterilize the containers entering the at least one filling unit, wherein the filling unit defines an aseptic environment inside it;
- at an infeed of the at least one blow-moulding unit to sterilize the parisons entering the at least one blow-moulding unit, wherein the blow-moulding unit and the at least one filling unit define an aseptic environment there-inside;
- at an infeed of the at least one heating module of the thermal conditioning structure to sterilize the parisons entering the at least one heating module, wherein the at least one heating module, the at least one blow-moulding unit and the at least one filling unit define an aseptic environment there-inside;
- at an infeed of the storage system to sterilize the parisons entering the storage system, wherein the storage system, the at least one heating module, the at least one blow-moulding unit and the at least one filling unit define an aseptic environment there-inside;
- at an infeed of a capping unit, which is included in the bottling line and is configured to receive caps made of thermoplastic material and to apply the caps securely to respective full containers, the sterilizing unit being located at the infeed of the capping unit to sterilize the containers entering the capping unit, wherein the capping unit defines an aseptic environment there-inside.

* * * * *